(12) United States Patent
Bierlein et al.

(10) Patent No.: US 10,322,546 B2
(45) Date of Patent: Jun. 18, 2019

(54) INDUCTION HEATING DEVICE

(71) Applicant: TETRA LAVAL HOLDINGS & FINANCE S.A., Pully (CH)

(72) Inventors: Pär Bierlein, Dalby (SE); Martin Alexandersson, Furulund (SE); Daniel Sandberg, Flyinge (SE); Karl Israelsson, Malmö (SE); Louis Carlioz, Arlöv (SE); Vincenzo De Salvo, Malmö (SE); Karl-Axel Johansson, Löddeköpinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 101 days.

(21) Appl. No.: 15/317,640

(22) PCT Filed: Jun. 10, 2015

(86) PCT No.: PCT/EP2015/062906
§ 371 (c)(1),
(2) Date: Dec. 9, 2016

(87) PCT Pub. No.: WO2015/189253
PCT Pub. Date: Dec. 17, 2015

(65) Prior Publication Data
US 2017/0120506 A1    May 4, 2017

(30) Foreign Application Priority Data
Jun. 12, 2014  (SE) ...................................... 1450723

(51) Int. Cl.
*H05B 6/10* (2006.01)
*B29C 65/36* (2006.01)
(Continued)

(52) U.S. Cl.
CPC ........ *B29C 65/3668* (2013.01); *B29C 65/368* (2013.01); *B29C 65/3656* (2013.01);
(Continued)

(58) Field of Classification Search
CPC ............... B29C 65/368; B29C 66/1122; B29C 66/3472; B29C 66/4312; B29C 66/43121;
(Continued)

(56) References Cited

U.S. PATENT DOCUMENTS

| 3,808,074 | A | * | 4/1974 | Smith | .................. | B21D 5/0209 |
| | | | | | | 156/272.4 |
| 4,169,004 | A | * | 9/1979 | Kock | .................. | A61F 13/2082 |
| | | | | | | 156/227 |
| 4,704,509 | A | | 11/1987 | Hilmersson et al. | | |
| 6,503,963 | B2 | | 1/2003 | Toyoda et al. | | |
| 7,002,117 | B2 | | 2/2006 | Thomasset | | |

(Continued)

FOREIGN PATENT DOCUMENTS

| CN | 1688483 | 10/2005 |
| CN | 102181156 | 9/2011 |

(Continued)

OTHER PUBLICATIONS

International Search Report (PCT/ISA/210) dated Aug. 7, 2015, by the European Patent Office as the International Searching Authority for International Application No. PCT/EP2015/062906.
International-Type Search Report (Form ITS 201) dated Jan. 9, 2015.
Office Action received in Chinese Application No. 201580031130.4 dated Jun. 15, 2018 in 19 pages.

*Primary Examiner* — Daniel McNally
(74) *Attorney, Agent, or Firm* — Knobbe, Martens, Olson & Bear, LLP

(57) ABSTRACT

A magnetic insert for enhancing the magnetic field of an induction heating device is provided. The magnetic insert is (Continued)

US 10,322,546 B2
Page 2 manufactured by use of a composition comprising a moldable polymer matrix and a soft magnetic material.

20 Claims, 4 Drawing Sheets

(51) Int. Cl.
| | |
|---|---|
| *B29C 65/00* | (2006.01) |
| *B65B 51/22* | (2006.01) |
| *B65B 51/30* | (2006.01) |
| *B65B 9/20* | (2012.01) |
| B29C 65/74 | (2006.01) |
| B29L 31/00 | (2006.01) |

(52) U.S. Cl.
CPC ...... *B29C 66/1122* (2013.01); *B29C 66/3472* (2013.01); *B29C 66/4312* (2013.01); *B29C 66/43121* (2013.01); *B29C 66/72321* (2013.01); *B29C 66/8122* (2013.01); *B29C 66/8126* (2013.01); *B29C 66/849* (2013.01); *B65B 9/20* (2013.01); *B65B 51/227* (2013.01); *B65B 51/30* (2013.01); *H05B 6/105* (2013.01); *B29C 65/745* (2013.01); *B29C 66/81431* (2013.01); *B29K 2995/0008* (2013.01); *B29K 2995/0013* (2013.01); *B29L 2031/712* (2013.01); *B29L 2031/7166* (2013.01)

(58) Field of Classification Search
CPC .......... B29C 66/72321; B29C 66/8122; B29C 66/8126; B29C 66/849; B65B 51/227; B65B 51/30
See application file for complete search history.

(56) References Cited

U.S. PATENT DOCUMENTS

| | | | |
|---|---|---|---|
| 2004/0045635 A1* | 3/2004 | Bandyopadhyay | ... B29C 39/003 148/104 |
| 2006/0124626 A1* | 6/2006 | Kupfer | ................ B29C 65/3656 219/243 |
| 2006/0154052 A1* | 7/2006 | Waffenschmidt | .... H05K 1/0373 428/339 |

FOREIGN PATENT DOCUMENTS

| | | |
|---|---|---|
| EP | 0 212 490 A2 | 3/1987 |
| EP | 1 107 358 A2 | 6/2001 |
| EP | 1 413 520 A1 | 4/2004 |
| EP | 1 541 641 A | 6/2005 |
| GB | 2506681 A | 4/2014 |
| JP | 2004-228043 A | 8/2004 |
| WO | WO 01 85827 A2 | 11/2001 |
| WO | WO 03/053626 A2 | 7/2003 |
| WO | WO 2005/004560 A1 | 1/2005 |
| WO | WO 2012/019925 A1 | 2/2012 |
| WO | WO-2012019925 A1 * | 2/2012 ......... B29C 65/3656 |

* cited by examiner

INDUCTION HEATING DEVICE

TECHNICAL FIELD

The present invention relates to an induction heating device, and a magnetic insert for such induction heating device. Particularly the present invention relates to an induction heating device for providing transversal sealing to packages having a conductive layer and a method for providing the induction heating device.

BACKGROUND

In liquid product packaging, e.g. in liquid food packaging, a carton-based packaging material is often used for forming the final packages. FIG. 1 shows an example of such a system. The packaging material may be provided as single sheets for creating individual packages in a filling machine, or as a web of material which is fed into a filling machine. The web of packaging material is normally distributed in large rolls 7 of which the filling machine is configured to feed the packaging material 3 through various treatment stations, such as sterilizers, forming sections 8, filling sections 10, and distribution sections of the filling machine.

The packaging material may be formed into an open ended tube. The tube is arranged vertically in the filling machine 10 and is subject to continuous filling as the packaging material is transported through the filling machine. As the packaging material, and thus the tube, is moving transversal seals 14 are provided for forming individual packages of the tube. Each package is separated from the tube by a sealing jaw 14 operating to also provide a transversal cut in the sealing area, and the individual packages 15 are transported for allowing subsequent packages to be separated from the tube.

The tube is formed by arranging the lateral ends of the packaging material such that they overlap, and by sealing the lateral ends to each other for creating a fluid tight connection between the lateral ends.

Induction heating devices for transversal sealing are commonly made up of five individual components, as shown in FIG. 2. A base structure 201 usually being made of aluminium supports a mounting core 202 which is typically made of polyphenylene sulfide (PPS). A number of inserts 203 of soft magnetic material are provided on the mounting core, for locally boosting the magnetic field of the induction heating device and thereby boosting the induced power at the conductive layer of the package leading to a local increase in power of approximate 30%. A coil 204 is arranged adjacent to the inserts 203, and finally a body structure 205 encases all of the other components. Similarly to the mounting core 202, the body structure 205 may be made of PPS. Normally such inductor heating device 20 is manufactured by mounting the base structure 201, the core 202, the insert(s) 203 and the coil 204 together in a mould, followed by injection moulding the body structure 205 over the mounted components.

Until today the magnetic inserts 203 are manufactured by sintering a soft magnetic material into rigid pieces. The sintering process is a very costly method, requiring advanced equipment while restricting the design freedom for the shape of the inserts 203.

Further to this known induction heating devices have limited life time expectancy. Over time the body structure becomes fatigued due to the intermittent pressing action towards the roll of packaging material which is required to provide the transversal seal.

Hence, an improved solution for magnetic inserts as well as induction heating devices utilizing such magnetic inserts would be advantageous.

SUMMARY

It is, therefore, an object of the present invention to overcome or alleviate the above described problems.

According to a first aspect, a magnetic insert for enhancing the magnetic field of an induction heating device is provided. The magnetic insert is manufactured by use of a composition comprising a mouldable polymer matrix and a soft magnetic material.

In an embodiment, the mouldable polymer matrix comprises PPS which is a durable material proven to be efficient in high speed applications such as when providing transversal seals in liquid food packaging.

The soft magnetic material may comprise NiZn ferrite. The concentration of the soft magnetic material may preferably be in the range of 30-70 volume percent. Depending on the particular application, requiring different properties of the magnetic insert, the chosen interval has proven to allow efficient manufacturing due to the relatively high percentage of polymer matrix, while still providing desired permeability.

The polymer matrix may preferably be injection mouldable, thermo formable, and/or transfer mouldable. In other embodiment, the polymer matrix may be selected as being printable using available 3D printers.

According to a second aspect, a method for manufacturing a magnetic insert for an induction heating device is provided. The method comprises the steps of providing a composition comprising a mouldable polymer matrix and a soft magnetic material, and forming said composition into said magnetic insert.

The step of forming said composition may be performed by injection moulding, thermo forming, transfer moulding, or 3D printing.

According to a third aspect an induction heating device for sealing two layers of a packaging material is provided. The induction heating device comprises a base structure supporting a magnetic insert according to the first aspect; a coil for inducing a magnetic field and arranged at a side of the magnetic insert opposite that of the base structure; and a body structure arranged to encompass the magnetic insert and coil when assembled.

The magnetic insert may be injection moulded between the base structure and the coil.

In an embodiment, the magnetic insert extends over a top surface of the base structure facing the coil.

The magnetic insert may be formed with a recess pattern for receiving the coil.

In a preferred embodiment, the base structure is made of stainless steel.

The magnetic insert may be arranged with at least one rounded, bevelled or chamfered protrusion on a top surface thereof, and in some embodiment the magnetic insert extends along the length of the coil.

According to a fourth aspect a method of manufacturing an induction heating device is provided. The method comprises the steps of mounting a base structure and coil in a first mould; injection moulding a magnetic insert according to the first aspect between the base structure and the coil, resulting in a first component; mounting said first component in a second mould; and injection moulding a body structure onto the first component, thereby forming said induction heating device.

The method may further comprise the step of forming the base structure of stainless steel.

BRIEF DESCRIPTION OF DRAWINGS

The above, as well as additional objects, features, and advantages of the present invention, will be better understood through the following illustrative and non-limiting detailed description of preferred embodiments of the present invention, with reference to the appended drawings, wherein.

DETAILED DESCRIPTION

As a general principle the proposed solution of forming the magnetic insert of a composition comprising a mouldable polymer matrix and a soft magnetic material will result in a number of benefits compared to previously known solutions. To start with, the choice of material will allow magnetic inserts to be produced by high speed equipment, such as injection moulding, etc. Further to this there are no longer constraints regarding the shape and dimensions, whereby the dimensions of the magnetic inserts may be designed freely.

In view of these advantages an idea is to provide an induction heating device being more mechanically robust and design flexible. This idea is put to practise by providing an induction heating device having a base structure with improved durability in view of the common solutions using PPS. Such a base structure may be a metallic material, such as stainless steel.

In order not to negatively affecting the induction heating capabilities, the metallic base structure is preferably shielded from the coil by means of a magnetic shield. The magnetic shield should for this purpose extend along the length of the coil such that the shield forms a physical barrier between the coil and the base structure. Due to the novel technique for providing the magnetic inserts, it has been realized that such magnetic insert provided as an elongate structure, may actually form such shield in a very efficient manner. The proposed magnetic inserts thus not only allow for more efficient manufacturing, but also allows for a metallic base of the induction heating device, which until today has not been possible.

In order to be able to provide a transversal sealing on the package using induction, the package is provided with a conducting layer which interacts with the magnetic field created by the induction heating device. This interaction will generate eddy currents in the conductive layer of the packaging material, which due to intrinsic resistance of the conductive layer will increase the temperature in the package material locally at the position of the seal, whereby the temperature increase is used to melt the polymeric layers of the package material for laminating the packaging material.

Figure 1:
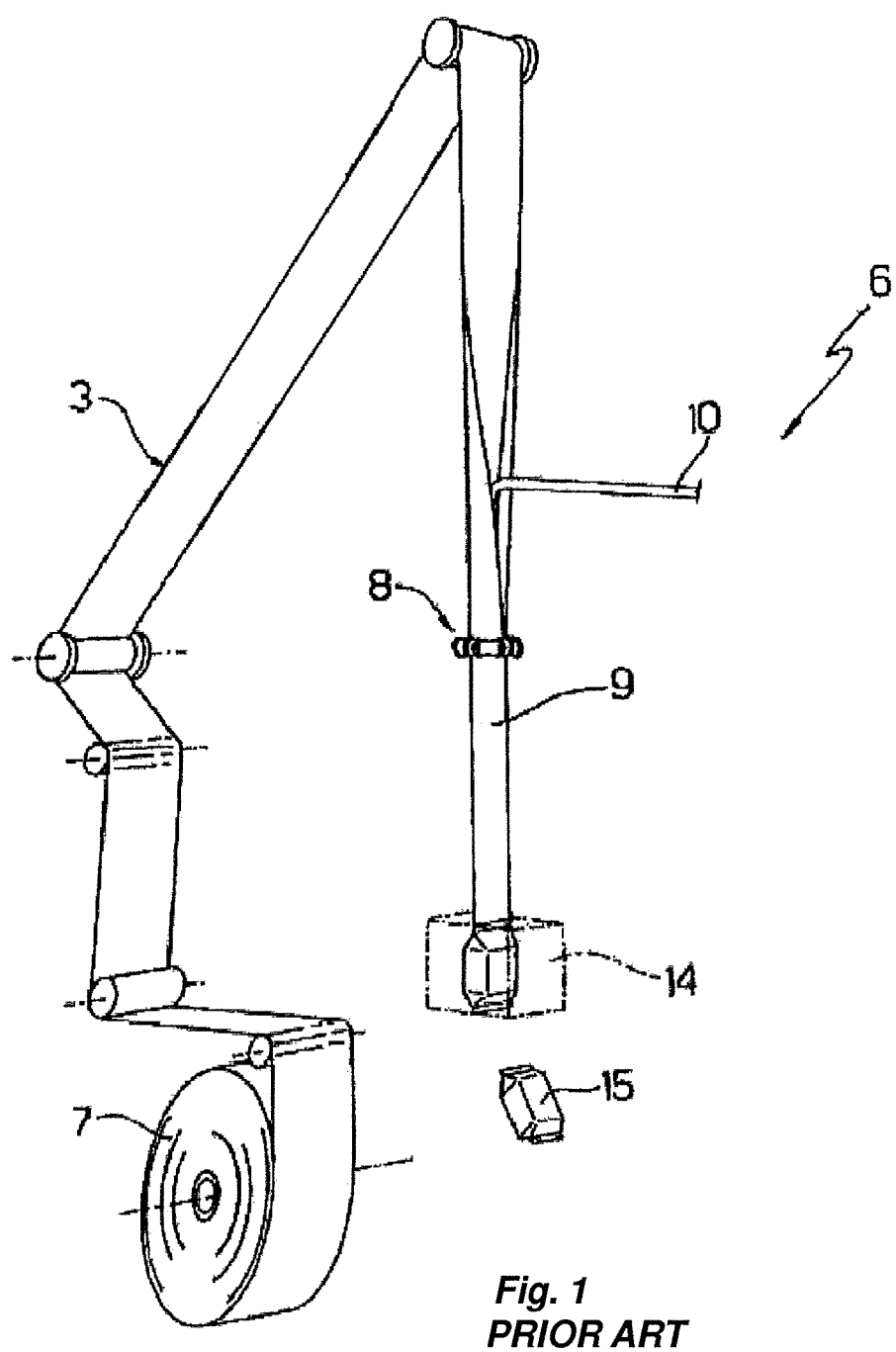
FIG. 1 is a schematic view of a prior art liquid product filling machine.
Figure 2:
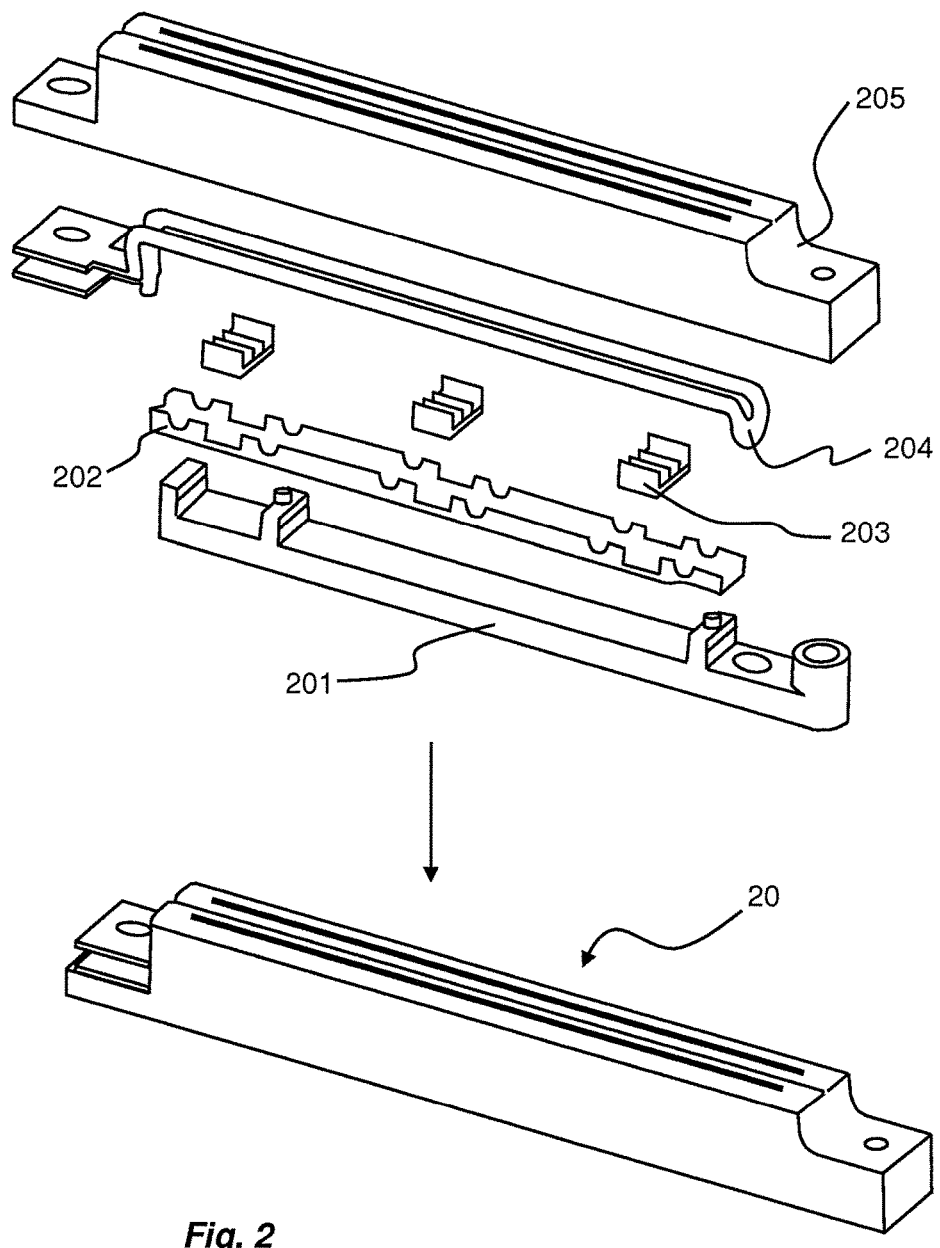
FIG. 2 is a schematic view of a prior art induction heating device for providing a transversal sealing on a package.
Figure 3:
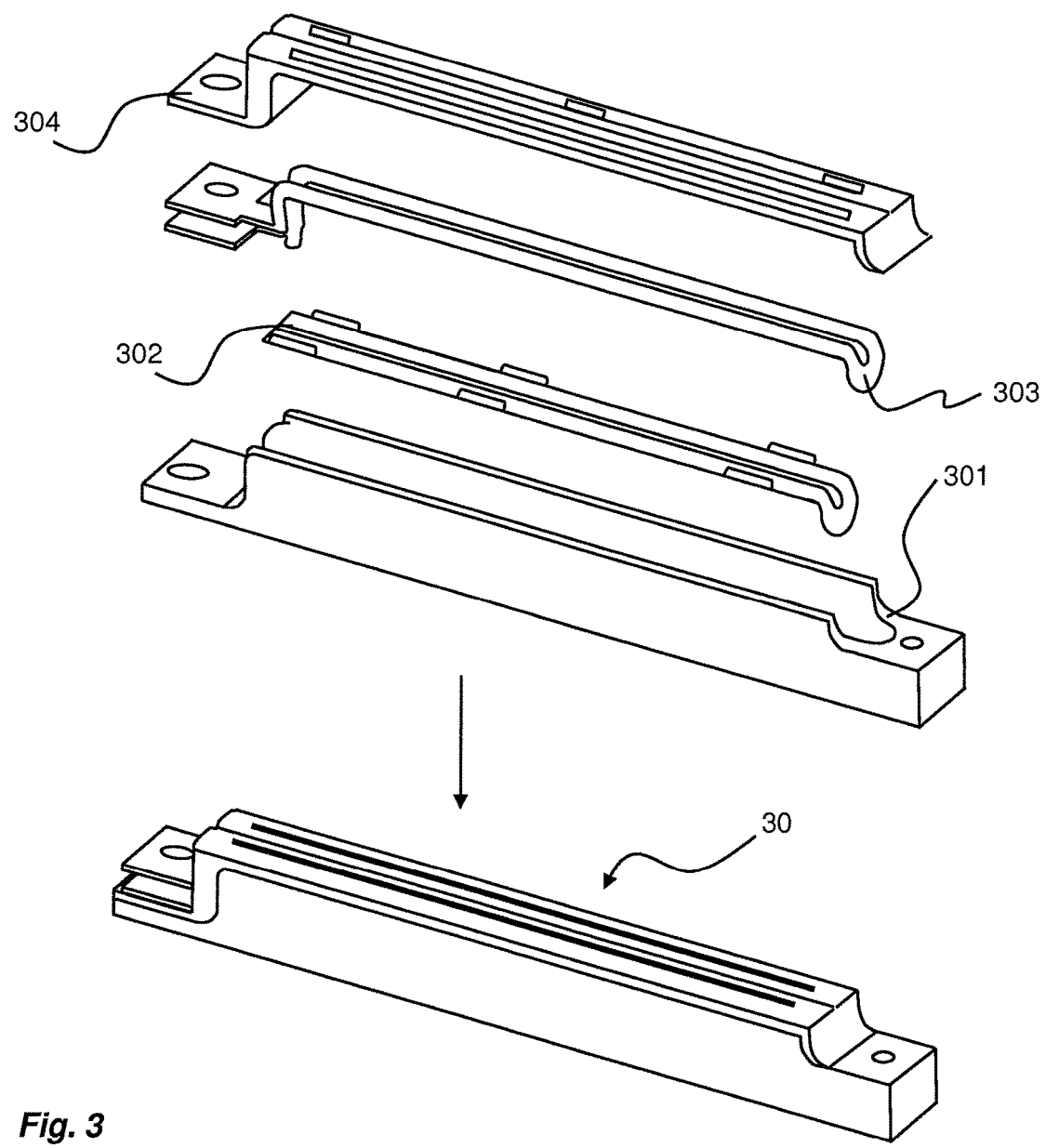
FIG. 3 is a schematic view of an inductor heating device according to an embodiment.

In an embodiment, according to FIG. 3, an induction heating device 30 is shown. The induction heating device comprises a base structure 301, preferably being formed by a rigid and durable metallic material such as stainless steel. The induction heating device 30 further comprises a magnetic insert 302 which is arranged on the base structure 301. The magnetic insert 302 is formed by a composition comprising a mouldable polymer matrix and a soft magnetic material. Preferably, the concentration of the soft magnetic material is chosen to lie in the interval of 30-70 volume percent, and in a more preferred embodiment between 50-70 volume percent.

A coil 303 is arranged onto the magnetic insert 302 at a side opposite that of the base material, whereby the magnetic insert 302 acts to shield off the metallic base structure from the coil. When current is flowing through the coil 303 the magnetic properties of the magnetic insert 302, caused by the provision of the soft magnetic material, will in fact increase the efficiency of the induction heating device 30. As the soft magnetic material of the magnetic insert 302 affects the permeability of the magnetic insert, a higher permeability allows for more magnetic field to pass through it, i.e. less field escapes into the stainless steel body which would cause heat losses.

Moreover, the induction heating device 30 comprises a body structure 304 being arranged in close proximity to the coil 303, and being provided to form a rigid body. The body structure should preferably be made of a rigid material being capable of withstanding repeated load, such as the case when used in high speed filling machines. Therefore, the body structure 304 may be manufactured of a compound comprising PPS and glass fibre, preferably by injection moulding the compound into a mould accommodating the base structure 301, the magnetic insert 302, and the coil 303.

The magnetic insert 302 comprises a soft magnetic material. The material used for the magnetic insert 302 may be chosen due to specific requirements of the particular application. For example, the magnetic insert 302 may be formed of a compound comprising PPS and NiZn ferrite, wherein the concentration of the NiZn ferrite is between 30 and 70 volume percent, preferably between 50 and 70 volume percent.

The functionality of the magnetic insert is at least twofold. Firstly, the metallic base structure 301 is shielded off from whereby it is prevented or at least limited to negatively affect the magnetic fields associated with the coil in use. Secondly, the soft magnetic material of the magnetic insert 302 acts to boosting the magnetic field of the coil, or in other words allowing for shaping the magnetic field in a desired shape which allows for a improved transversal sealing functionality. Hence, using the magnetic insert 302, there is no need of using separate inserts as in known solutions.

In an embodiment, the soft magnetic material of the magnetic insert comprises a polymer matrix provided with soft magnetic particles. The polymer matrix may comprise polyphenylene sulfide (PPS), whereby the magnetic insert 392 may be mouldable by various techniques such as injection moulding, thermo forming, transfer moulding, 3D printing, etc.

In an embodiment, the magnetic insert 302 extends over a top surface of the base structure 301 facing the coil 303.

In an embodiment, the magnetic insert 302 is arranged in a shape such that when the coil 303 is arranged in the magnetic insert 302, the magnetic insert 302 shields the coil 303 from the base structure 301 in any linear direction from the coil 303 to the base structure 301.

In an embodiment, the magnetic insert 302 has a shape with a recess pattern for receiving the coil 303, in a preferably tight fit. The recess pattern is preferably extending in a center part of the magnetic insert 302 substantially along the entire length of the magnetic insert 302, such that the recess pattern may be formed by moulding the magnetic insert 302 partly around the coil 303.

In an embodiment the magnetic insert 302 is injection mouldable. By utilizing injection moulding, the magnetic insert 302 may be moulded directly to the coil 303, thereby increasing the efficiency of the inductor. In relation to current solutions, the injection moulded magnetic insert 302 reduces the number of internal components, as the need of separate inserts is removed. A reduced number of internal components make the design more robust since the injection moulded material will have a more homogenous volume to fill. Furthermore, manufacturing time is reduced since the need of manual mounting of the inserts is removed. As a result of reducing manual labour, the risk of errors is also reduced during manufacturing.

The magnetic insert 302 may be injection moulded by utilizing an injection moulding tool, in which the base structure 301 and coil 303 is mounted. Since the magnetic insert 302 is shaped directly during injection moulding process in the injection moulding tool, tolerance chain problems may be avoided.

Injection moulding of the magnetic insert 302 also enables compensation in sealing critical areas, since the shape of the magnetic insert 302 may be chosen such that an increased amount of material is arranged at critical positions, e.g. at the lateral ends as well as at the position of the longitudinal sealing overlap.

In an embodiment, the base structure is made of stainless steel. A base structure being made of stainless steel has better life time expectancy than the commonly known aluminium base structures. Preferably the base structure should not be magnetic since that would adversely affect the efficiency of the inductor. Depending on the final application's requirements a material should be chosen. Aluminium may very well be fully suitable for some applications where the environmental conditions are less severe. In prior art solutions the magnet inserts 302 have sharp transitions due to manufacturing by sintering processes. Such sharp corners are limiting for the number of design options, due to the fact that such sharp corners may give rise to cracks and material fatigue in the polymer body 205. Further to this, sharp edges of the inserts 203 may cause unwanted distribution of the magnetic field, whereby losses will occur.

In an embodiment the magnetic insert 302 is arranged with a number of protrusions 321 on a top surface thereof. The protrusions are rounded, bevelled or chamfered to allow for improved performance as this allows for tailor making the shape of a desired magnetic field used for transversal sealing. In other words, the protrusions are arranged with smooth transitions for two reasons; i) the body 304 will have an increased life length, and ii) the generated magnetic field may have an increased efficiency. Accordingly, by using injection moulding, the magnetic insert may be arranged in a form which may shape the magnetic field with the right amount of power in every point along the magnetic insert. Using rounded, bevelled or chamfered protrusions further reduces the risk of internal cracks due to the absence of sharp corners, which adds to the life time expectancy of the magnetic insert. Furthermore, such a magnetic insert allows for reduced resistive losses internally in the Inductor whereby the internal temperature is reduced.

In an embodiment, the induction heating device is manufactured by a two-component moulding process, wherein the first component comprises moulding the magnetic insert to the mounted coil and base structure, and the second component would be to mould the body structure onto the first component. Such a manufacturing process may be automated to a much higher degree compared to known solutions.

Figure 4:
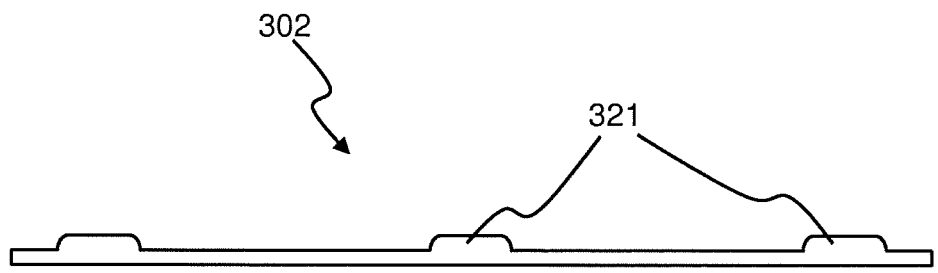
FIG. 4 is a schematic side view of magnetic insert being provided with rounded protrusions according to an embodiment.
Figure 5:
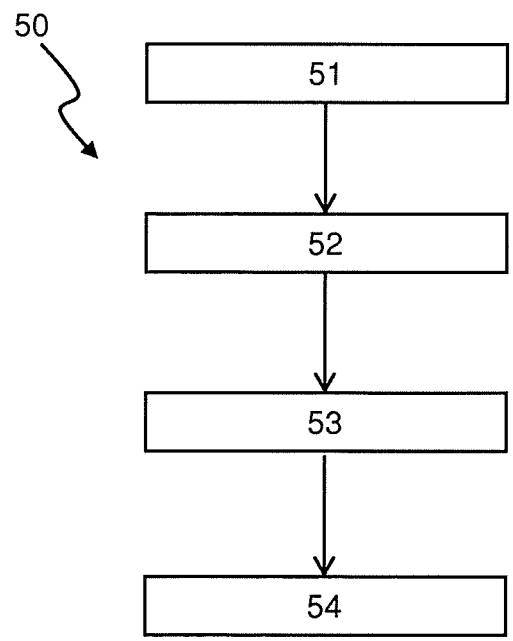
FIG. 5 is flowchart of a method according to an embodiment.

In an embodiment, according to FIG. 4, a method 50 of manufacturing an induction heating device is provided. The method comprises the step 51 of mounting a base structure 301 and coil 303 in a first mount. The method further comprises a step 52 of injection moulding a magnetic insert 302 between the base structure 301 and the coil 303, resulting in a first component. Moreover, the method comprises a step 53 of arranging the first component in a second mould, and a step 54 of injection moulding a body structure 304 to the first component in a second mount, thereby forming said induction heating device.

Although the above description has been made mostly with reference to an induction heating device for transversal sealing of a package, it should be appreciated that the disclosed induction heating device may be used in many other sealing applications in which sealing by induction is desired.

Further, the invention has mainly been described with reference to a few embodiments. However, as is readily understood by a person skilled in the art, other embodiments than the ones disclosed above are equally possible within the scope of the invention, as defined by the appended claims.

The invention claimed is:

1. An induction heating device for sealing two layers of a packaging material, the induction heating device comprising:
   a metallic base structure supporting an injection moulded magnetic insert, the injection moulded magnetic insert comprising a mouldable polymer matrix and a soft magnetic material, wherein the metallic base structure is positioned adjacent to a first side of the injection moulded magnetic insert;
   a coil for inducing a magnetic field, the coil positioned adjacent to a second side of the injection moulded magnetic insert opposite that of the first side; and
   a body structure arranged to encompass the injection moulded magnetic insert and coil when assembled;
   wherein the injection moulded magnetic insert extends along and adjacent to an entire length of the coil, the injection moulded magnetic insert forming a physical barrier between the coil and the metallic base structure; and
   wherein the injection moulded magnetic insert comprises one or more protrusions extending non-continuously along a portion of a top surface of the magnetic insert, the one or more protrusions configured to improve a performance of the magnetic field induced by the coil when the induction heating device is in use.

2. The induction heating device according to claim 1, wherein the mouldable polymer matrix comprises PPS.

3. The induction heating device according to claim 1, wherein the soft magnetic material comprises NiZn ferrite.

4. The induction heating device according to claim 1, wherein the concentration of the soft magnetic material is 30-70 volume percent.

5. The induction heating device according to claim 1, wherein the magnetic insert extends over a top surface of the base structure facing the coil.

6. The induction heating device according to claim 1, wherein the magnetic insert comprises a recess pattern for receiving the coil wherein the recess pattern extends along a center part of the magnetic insert.

7. The induction heating device according to claim 1, wherein the base structure is made of stainless steel.

8. The induction heating device according to claim 1, wherein the one or more protrusions of the magnetic insert are rounded, beveled, or chamfered so as to reduce a risk of internal cracks of the magnetic insert when in use.

9. A method of manufacturing an induction heating device comprising the steps of:
mounting a metallic base structure and coil in a first mould, wherein the coil comprises a first end and a second end;
injection moulding a magnetic insert between the metallic base structure and the coil, resulting in a first component, wherein the magnetic insert comprises a mouldable polymer matrix and a soft magnetic material, and wherein the magnetic insert extends adjacent to a length of the coil between the first and second ends and forms a physical barrier between the coil and the metallic base structure;
mounting said first component in a second mould; and
injection moulding a body structure onto the first component, thereby forming said induction heating device.

10. The method according to claim 9, further comprising the step of forming one or more protrusions along a portion of a top surface of the magnetic insert, the one or more protrusions configured to improve a performance of the magnetic field induced by the coil when the induction heating device is in use.

11. The method according to claim 10, wherein the one or more protrusions extend non-continuously along the portion of the top surface of the magnetic insert.

12. The method according to claim 10, wherein the one or more protrusions of the magnetic insert are rounded, beveled, or chamfered so as to reduce a risk of internal cracks of the magnetic insert when in use.

13. The method according to claim 9, further comprising the step of forming a recess pattern in a center part of the magnetic insert, the recess pattern configured to receive the coil.

14. The method according to claim 13, wherein the recess pattern extends along an entire length of the magnetic insert.

15. The method according to claim 9, further comprising the step of forming the base structure of stainless steel.

16. The method according to claim 9, wherein the mouldable polymer matrix comprises PPS.

17. The method according to claim 9, wherein the soft magnetic material comprises NiZn ferrite.

18. The method according to claim 9, wherein the concentration of the soft magnetic material is 30-70 volume percent.

19. The method according to claim 9, wherein the magnetic insert extends over a top surface of the base structure facing the coil.

20. The method according to claim 9, wherein the body structure is made of a compound comprising PPS and glass fibre.

* * * * *